(No Model.)
B. McGINTY.
TYMPAN GAGE.
No. 573,345.  Patented Dec. 15, 1896.
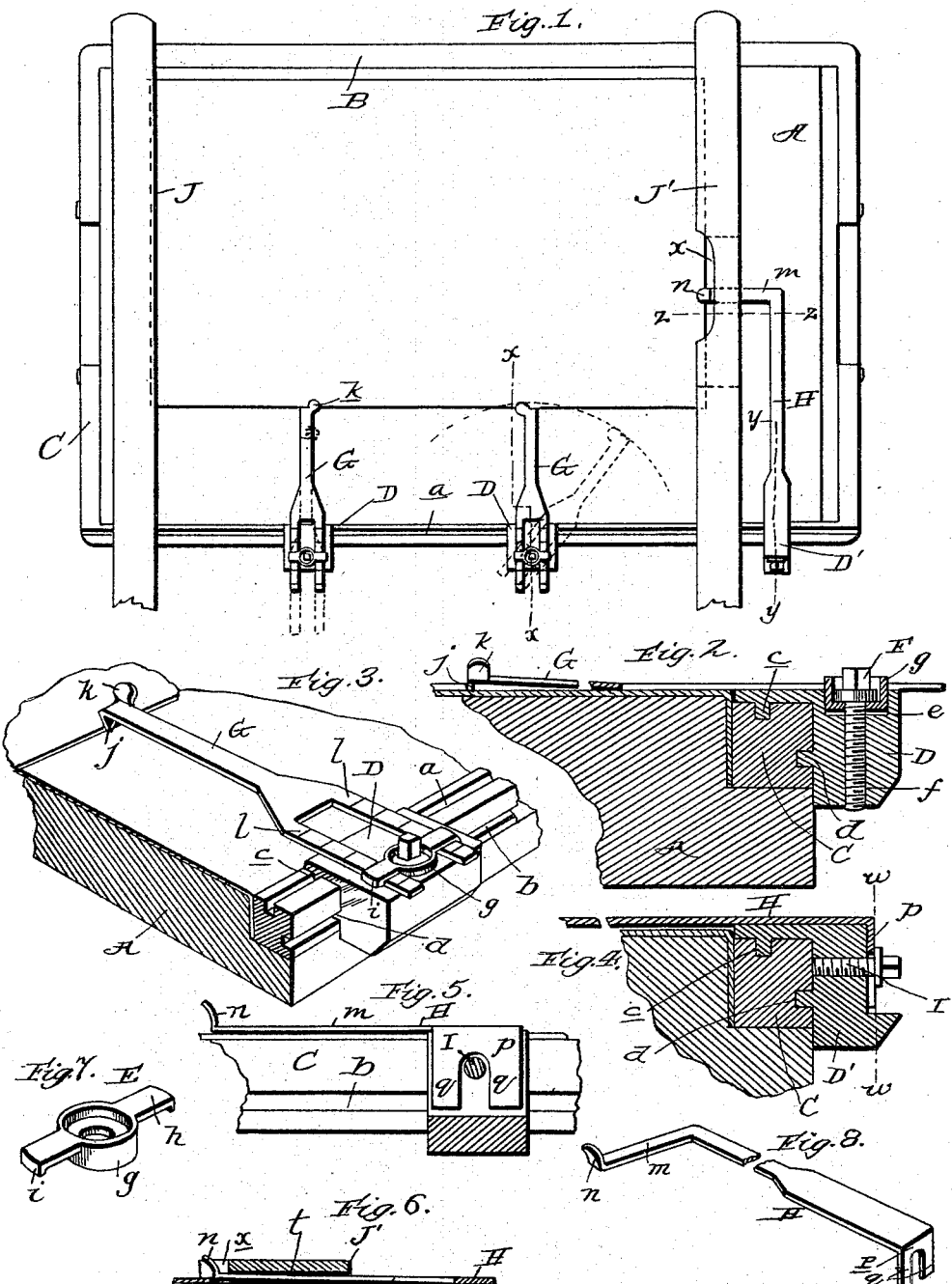
Witnesses:
C. H. Raeder
W. A. James
Inventor
B. McGinty
By James J. Shuhy
Attorney

UNITED STATES PATENT OFFICE.

BERNARD McGINTY, OF DOYLESTOWN, PENNSYLVANIA.

TYMPAN-GAGE.

SPECIFICATION forming part of Letters Patent No. 573,345, dated December 15, 1896.

Application filed February 10, 1896. Serial No. 578,703. (No model.)

*To all whom it may concern:*

Be it known that I, BERNARD MCGINTY, a citizen of the United States, residing at Doylestown, in the county of Bucks and State of Pennsylvania, have invented certain new and useful Improvements in Tympan-Gages; and I do declare the following to be a full, clear, and exact description of the invention, such as will enable others skilled in the art to which it appertains to make and use the same.

My invention relates to improvements in feed-gages for printing-presses; and it has for its general object to provide a simple, durable, and thoroughly practical gage, the parts of which are adapted to be very quickly and easily adjusted, so as to enable them to properly register or gage sheets of various shapes and sizes.

Other objects and advantages of the invention will be fully understood from the following description and claims when taken in conjunction with the accompanying drawings, in which—

Figure 1 is an elevation of the platen of a printing-press with my improvements attached thereto. Fig. 2 is a detail section, on an enlarged scale, taken in the plane indicated by the line $x\,x$ of Fig. 1. Fig. 3 is a detail sectional perspective view illustrating a portion of the platen, the slide or carriage mounted on one of the bands of the platen, and a gage connected with the slide. Fig. 4 is a detail section, on an enlarged scale, taken in the plane indicated by the line $y\,y$ of Fig. 1. Fig. 5 is an enlarged detail section taken in the plane indicated by the line $w\,w$ of Fig. 4. Fig. 6 is a detail enlarged section taken in the plane indicated by the line $z\,z$ of Fig. 1. Fig. 7 is an enlarged detail perspective view of one of the clamping-pieces for holding the gages; and Fig. 8 is a perspective view of what I will, for convenience of description, term the "side" gage.

In the said drawings similar letters designate corresponding parts in all of the several views, referring to which—

A indicates the platen of a printing-press. B indicates one of the hinged bands thereof, which is the one that is generally raised when padding is to be placed on or removed from the platen, and C indicates the other platen-band, which may be and preferably is connected with the platen in a hinged manner and is designed, in conjunction with the band B, to properly hold padding on the platen in the ordinary manner. This band C is provided in the two exposed sides of its cross-bar with grooves $a$ and $b$, and these grooves, which preferably extend the full length of the bar, are designed to receive the tongues $c\,d$, respectively, of the slides or gage-supports D D', so as to permit of the said slides being moved on the bar in the direction of the length thereof, and yet prevent them from moving downwardly or outwardly with respect to the same. The said grooves $a\,b$ also serve effectually, as will be readily observed by reference to Fig. 3, to prevent even the slightest downward or outward movement of the slides or carriages, and they consequently enable the said slides to slide freely and yet reduce the liability of their casually moving to a minimum, which is a desideratum.

In virtue of the grooves $a\,b$ being formed in the exposed sides of the cross-bar of band C and the slides D D' being provided with tongues to take into said grooves, the slides may be moved along the cross-bar without the necessity of raising the band from the platen, and yet the usefulness of the band C as a means for clamping padding on the platen is not impaired.

The slides D, of which there are preferably two employed, are provided in their outer sides with sockets $e$, preferably of circular form, and they are further provided with the threaded apertures $f$, which communicate with the sockets $e$, as better illustrated in Fig. 2 of the drawings. The said sockets $e$ are designed and adapted to receive the preferably circular bodies $g$ of the clamps E for holding the gages, which bodies $g$ are preferably hollow, as shown, and are provided in their bottoms with central apertures for the passage of the attaching and binding screws F, which take into the threaded apertures $f$ of the slides and preferably have their upper ends headed and squared, as shown, for the engagement of a wrench-key or the like.

The clamps or clamping-pieces E are provided with arms $h$, and these arms, which extend in opposite directions from the bodies $g$, are provided at their outer ends with short depending branches or feet $i$, which are designed and adapted to enable the clamps to hold the gages G in their proper relation to the clamps and slides while said gages are being adjusted, as presently described.

As better illustrated in Fig. 3, the gages G are provided at their forward or upper ends with the depending branches $j$, which are designed to form a rest for one edge of the sheets of paper, as shown, and at the same end the said gages are provided with the lateral ears $k$, which are designed with a view of assisting the sheets of paper in leaving the form after an impression has been made. At their opposite ends the gages G are bifurcated, so as to form the legs or branches $l$, which straddle the body portions $g$ of the clamps and extend between the clamp-arms $h$ and the slides and between the feet $i$ and the clamp-bodies, as better illustrated in Fig. 3. In virtue of this construction and manner of adjustably fixing the gages G it will be seen that when the screws F are loosened the gages G may be very easily moved in the direction of their length or may be swung laterally, as illustrated by dotted lines in Fig. 1, or may be moved lengthwise and swung laterally at one and the same time until they are in the exact position for gaging the sheets of paper to be printed. They may then be adjustably fixed in such position by simply turning the screws F with a wrench-key in the direction to tighten them, which may be very quickly and easily done, as is obvious.

As will be readily observed by reference to Fig. 2, the sockets $e$ in the slides D are of such a depth and the bodies $g$ of the clamps E are of such a size and are so arranged that when said bodies are in the sockets a slight space is afforded between the lower ends of the bodies and the bottoms of the sockets. This, as will be readily observed, permits of the gages G being securely clamped between the clamps and the slides and prevents the gages from being rendered useless by frequent adjustments of the gages.

The placing of the sheets of paper against the gages G does not tend in any manner to move the slides D along the cross-bar of the band C, and therefore frictional contact may be depended upon to hold the said slides in the positions in which they are placed and against casual movement.

H indicates the side gage, against which one side edge of the sheets of paper is placed, as better shown in Fig. 1. This gage H rests flat upon the face of the platen, and it is provided at its upper end with the inwardly-extending lateral branch or arm $m$, which has an ear $n$ at its end, as shown. At its opposite or lower end the gage H is provided with the angular branch $p$, which is bifurcated, as shown, to form the branches $q$, which straddle the securing-screw I, as better illustrated in Fig. 4. This screw I takes into the slide D' in a position at right angles to the screws F, and like the said screws F it is headed at its outer end for the engagement of a wrench-key or the like, whereby it may be readily loosened when it is desired to remove or adjust the gage H, and may be as readily tightened to adjustably fix the said gage in the position desired. As the placement of the sheets of paper against the gage H will tend to move the slide D' on the cross-bar of the band C in the direction of the length thereof, the screw I is preferably made to serve the additional function of binding the slide D' on the cross-bar of the band C, as shown in Fig. 4.

J J' indicate the gripping-arms of the printing-press. These arms are designed to be operated in the ordinary manner by mechanism (not illustrated) and the arm J is of the ordinary construction. The arm J', however, has a recess $t$, Fig. 6, in its forward side, which is designed to receive the arm $m$ of the gage H when the arm J' rests against the platen, and said arm J' also has its inner edge recessed, as indicated by $x$, to accommodate the upwardly-extending ear $n$ of the gage H. These recesses $t\ x$ are of such a length, as illustrated, as to enable them to accommodate the gage H in its various adjusted positions.

It will be appreciated from the foregoing that when the platen of a printing-press is equipped with my improvements it may be very quickly and easily adjusted and adapted for the printing of sheets of various shapes and sizes, and it will also be observed that when sheets are to be printed upon both sides after one side is printed upon the sheet may be exactly registered, so that the printing upon the opposite side will be at the same points as that upon the first-named side, which is highly desirable, as is well known.

It will be further observed that my improved gage is very simple and durable and that it is thoroughly practical for all kinds of job-printing.

I am well aware that a hand printing-guide comprising a rule having grooves in its vertical and upper horizontal sides and a slidable plate having ears arranged in the grooves of the rule is old, and I therefore make no claim to such construction.

Having described my invention, what I claim, and desire to secure by Letters Patent, is—

1. In a feed-gage for printing-presses, the combination of a gage-support, a gage bifurcated and arranged on the said gage-support, a clamping-piece having a body portion resting in the bifurcation of the gage and also having arms resting above the legs of the gage and depending branches on said arms, and means for connecting the body portion of the clamping-piece and the gage-support, substantially as specified.

2. In a feed-gage for printing-presses, the combination of a gage-support, a gage bifurcated and arranged on the said support, a clamping-piece having a body portion resting in the bifurcation of the gage and also having arms resting above the legs of the gage and means for engaging said legs so as to permit of the clamping-piece being turned by and with the gage, and means for connecting the body portion of the clamping-piece and the gage-support, substantially as specified.

3. In a feed-gage for printing-presses, the combination of a platen, a band connected with the platen and having longitudinal grooves in the exposed sides of its cross-bar, a slide or carriage mounted on the cross-bar of the band and having tongues resting in the longitudinal grooves thereof, and also having a socket and a threaded aperture communicating with the same, a gage bifurcated at one end and having such bifurcated end arranged on the slide or carriage, a clamping-piece having a circular body portion resting in the bifurcation of the gage and also in the socket of the slide or carriage and also having the arms resting above the legs of the gage and the depending branches on said arms, and a screw extending through the body portion of the clamping-piece and into the threaded aperture of the slide or carriage, substantially as specified.

4. In a feed-gage for printing-presses, the combination of a gage-support, having a socket and a threaded aperture communicating with the same, a gage bifurcated at one end and having such bifurcated end arranged on the said support, a clamping-piece having a circular body portion resting in the bifurcation of the gage and also in the socket of the gage-support and also having the arms resting above the legs of the gage and the depending branches on said arms, and a set-screw extending through the body portion of the clamping-piece and into the threaded aperture of the gage-support, substantially as specified.

5. In a feed-gage for printing-presses, the combination of a platen, a band connected with the platen and having longitudinal grooves in the exposed sides of its cross-bar, a slide or carriage mounted on the cross-bar of the band and having tongues resting in the longitudinal grooves thereof, and also having a threaded aperture, a screw taking through said aperture and adapted to engage the band of the platen, a gage resting on the slide or carriage and engaged and held by the screw and having an inwardly-extending lateral branch, and a gripping-arm shaped to accommodate said gage, substantially as specified.

6. In a feed-gage for printing-presses, the combination of a platen, a band connected with the platen and having longitudinal grooves in the exposed sides of its cross-bar, a slide or carriage mounted on the cross-bar of the band and having tongues resting in the longitudinal grooves thereof, a gage carried by said slide, a second slide or carriage having tongues resting in the grooves of the cross-bar of the band, and also having a threaded aperture, a screw taking through said aperture and adapted to engage the band of the platen, a gage resting on the second-named slide and engaged and held by the screw thereof and having a lateral inwardly-extending branch and a gripping-arm having its forward side recessed to accommodate the lateral branch of the latter-named gage, substantially as specified.

In testimony whereof I affix my signature in presence of two witnesses.

BERNARD McGINTY.

Witnesses:
WM. STUCKERT,
PAUL H. APPLEBACH.